United States Patent
Marquart

(10) Patent No.: US 7,469,484 B2
(45) Date of Patent: Dec. 30, 2008

(54) DEVICE AND METHOD FOR THE CENTRALLY TIGHTENING ROTATINGLY DRIVABLE PARTS

(75) Inventor: Uwe Marquart, Bodman (DE)

(73) Assignee: Ingeborg Marquart, Bodman (DE)

( * ) Notice: Subject to any disclaimer, the term of this patent is extended or adjusted under 35 U.S.C. 154(b) by 0 days.

(21) Appl. No.: 10/538,539

(22) PCT Filed: Dec. 3, 2003

(86) PCT No.: PCT/EP03/13617

§ 371 (c)(1),
(2), (4) Date: Jun. 19, 2006

(87) PCT Pub. No.: WO2004/052592

PCT Pub. Date: Jun. 24, 2004

(65) Prior Publication Data

US 2006/0249918 A1    Nov. 9, 2006

(30) Foreign Application Priority Data

Dec. 11, 2002    (DE) ............... 102 59 257

(51) Int. Cl.
*G01B 5/25*    (2006.01)
*B23B 31/36*   (2006.01)

(52) U.S. Cl. .............. 33/550; 33/636; 33/412; 279/6; 279/133

(58) Field of Classification Search ............ 33/636, 33/412, 529, 543, 549, 550; 279/6, 133
See application file for complete search history.

(56) References Cited

U.S. PATENT DOCUMENTS

| | | | | |
|---|---|---|---|---|
| 1,477,257 A | * | 12/1923 | Fritz | 33/412 |
| 3,125,811 A | * | 3/1964 | Pierce et al. | 33/550 |
| 3,178,192 A | * | 4/1965 | Sampson | 279/6 |
| 3,516,680 A | * | 6/1970 | Andre | 279/6 |
| 3,544,117 A | | 12/1970 | Bingham | |
| 3,751,053 A | * | 8/1973 | Swanson | 279/133 |
| 4,215,482 A | * | 8/1980 | Szewczyk | 33/412 |
| 4,666,353 A | * | 5/1987 | Micek | 279/6 |
| 4,775,947 A | * | 10/1988 | Marron | 33/550 |
| 5,117,081 A | * | 5/1992 | Bagdal | 33/550 |
| 5,427,484 A | | 6/1995 | Galli | |
| 6,421,929 B1 | * | 7/2002 | Keefe | 33/549 |
| 6,427,353 B1 | * | 8/2002 | Nelson et al. | 33/549 |
| 6,598,884 B1 | * | 7/2003 | McCluskey et al. | 279/51 |

FOREIGN PATENT DOCUMENTS

WO    WO00/13069    3/2000

OTHER PUBLICATIONS

Int'l Search Report (PCT/ISA/210) May 19, 2004.

* cited by examiner

*Primary Examiner*—Christopher W Fulton

(57) ABSTRACT

A device and a method are disclosed for centrally tightening rotatingly drivable parts. The device comprises at least three units for clamping and adjusting a part, wherein at least two of the units comprise an actuator allowing controlled adjustment in radial direction according to a control value. A measuring device is provided to detect deviations of the part from concentricity with respect to a rotary drive axis. A computer is used for controlling the actuators to effect concentricity of the part, the computer being responsive to deviations from concentricity detected by said measuring device.

20 Claims, 3 Drawing Sheets

DEVICE AND METHOD FOR THE CENTRALLY TIGHTENING ROTATINGLY DRIVABLE PARTS

RELATED APPLICATIONS

This application is a U.S. national phase application under 35 U.S.C. 371 of International Patent Application PCT/EP2003/013617 filed on Dec. 3, 2003 claiming priority of German patent application DE 102 59 257.8 which is fully incorporated by reference herewith.

BACKGROUND OF THE INVENTION

The present invention relates to a device and a method for the concentric chucking of parts that can be set into revolving operation.

In production engineering, numerous parts need to be worked in a plurality of successive steps. When producing milling tools, for example, there may first be required a turning or grinding process, which may be followed by a process of milling grooves into the part. It is then desired to have the groove correctly aligned relative to the longitudinal axis of the respective milling tool.

The task of chucking such a part concentrically always represents a problem. In most of the cases, attempts are made to adjust the chucked part manually in an effort to achieve correct concentricity, by making the desired corrections by hammer strokes, for example, or in a similar way.

Further, it is desirable especially for milling tools with high spindle speeds to be able to chuck the respective milling tools concentrically so that correct concentricity is achieved. Although it has been known in this connection to chuck even very small tools at high force and with high accuracy, for example using a shrink chuck, there remains the risk that chucking errors may occur when clamping the shrink chuck on the milling spindle, for example.

SUMMARY OF THE INVENTION

Thus it is a first object of the present invention to disclose a device for the concentric chucking of parts that can be rotatingly driven.

It is a second object of the invention to provide a device for the concentric chucking of parts that which permits the concentricity of the chucked part to be adjusted with the highest possible precision.

It is a third object of the invention to provide a device for the concentric chucking of parts having a simple construction while providing a high precision.

It is a fourth object of the present invention to disclose method for the concentric chucking of parts that can be rotatingly driven.

These and other objects of the invention are achieved n by a device for the concentric chucking of rotatingly drivable parts having a chucking and adjusting fixture comprising at least three units for clamping and adjusting the part, at least two of which comprise actuator means allowing defined adjustment in radial direction by a manipulated variable, further having a measuring device adapted to detect deviations from concentricity of the part, and having a computing device for computing the manipulated variables required for the actuator means in order to achieve concentricity of the chucked part.

With respect to the method, the object is further achieved by a method for the concentric chucking of parts that can be set into revolving operation, wherein the part is chucked in a chucking and adjusting fixture by at least two adjusting units adapted to chuck and adjust the part, and at least one clamping unit, whereafter the part is set into revolving operation, the deviations from concentricity are measured and converted to manipulated variables by which the adjusting units must be adjusted to achieve concentricity of the part.

According to the invention it is now possible to detect any deviations from concentricity on a part already chucked, using a measuring device, and to then convert the deviations to control variables by which the adjusting devices must be adjusted in a defined way to achieve correct concentricity.

Preferably, the chucking and adjusting fixture comprises for this purpose a first set of three clamping and adjusting units, as well as a second set of clamping and adjusting units which is offset in axial direction relative to the first set of units. This permits a chucked part to be correctly adjusted to achieve concentricity both with respect to possible couple unbalances and with respect to possible parallel unbalances.

Preferably, each set of units comprises two actuator means, each provided with adjusting devices, and one clamping unit, the units being provided at equal angular spacing one from the other.

While the clamping unit merely serves as abutment during the chucking and adjusting operations, the adjustment as such is effected in this case using the adjusting devices.

The adjusting units preferably comprise radially adjustable plungers.

The part to be chucked is, therefore, supported in two axially offset planes between two sets of three clamping points each, which permits especially simple adjustment with respect to both couple unbalances and parallel unbalances.

The adjusting units preferably comprise plungers that can be radially adjusted by means of setscrews or a servo-drive. This permits the plungers of the adjusting units to be positively moved to the desired position. On the other hand, the clamping force of the clamping units is preferably provided by tension springs so that the clamping units are permitted to yield when positional changes have to be made using the adjustable plungers of the adjusting units.

According to an advantageous further development of the invention, the actuator means are provided with a step-down system.

Such a feature permits especially sensitive adjustment with a view to achieving correct concentricity.

For this purpose, each actuator means may, for example, comprise a differential thread with two threads of different pitches, the difference in displacement being then converted to an actuator travel value for radial adjustment.

This allows especially precise and sensitive adjustment so that, for example, a defined angular rotation of an adjusting unit can be converted to a very small radial actuator travel value by a setscrew or a servo-drive.

Preferably, the second thread, being driven by the first thread, acts via an adjusting cone with a conical outer surface upon a plurality of balls which are further guided on a stationary inner surface of the cone, the balls acting on the plunger for effecting further stepping-down of a setting movement of the actuator means by a lateral yielding movement along the two cone surfaces.

Due to the further stepping-down action, this feature allows even more sensitive adjustments, while at the same time proper alignment relative to the plunger axis can be ensured by transmission of the forces to the plunger via the balls, so that tilting errors can be avoided.

In this connection, the balls preferably act on a flange on which the plunger is formed.

Further, the flange is biased in radially outward direction relative to the balls by at least one spring element, there being further provided at least one second spring element which acts to bias the adjusting cone relative to the flange in radially outward direction.

This guarantees that the flange will remain in permanent contact with the balls, while ensuring at the same time resetting of the adjusting cone in the event of an outwardly directed radial movement.

According to a further advantageous development of the invention, the clamping units comprise plungers that can be tensioned in radial direction, the plungers in their tensioned position being urged inwardly in radial direction by tension springs.

As has been mentioned before, this guarantees the required flexibility in radial direction when the adjusting elements are displaced by a given amount by the adjusting means for adjustment of the part.

According to an additional further development of the invention, there is provided a chucking device for chucking the part, which has a clamping section that is received in the chucking and adjusting fixture.

This allows conventional chucking of the part to be mounted for example in a mechanical chuck, a shrink chuck or a split chuck, for example, whereafter a clamping section of that completely clamped unit can be mounted in the chucking and adjusting fixture and can be adjusted for concentricity.

This allows parts of a wide range of diameters to be mounted in a clamping unit suited for that purpose, which can then be adjusted in the chucking and adjusting fixture for concentricity. This means that the clamping operation for the part to be chucked is decoupled from its adjustment for concentricity so that one and the same chucking and adjusting fixture can be used for concentric chucking of the most various parts.

According to an advantageous further development of the invention, there are provided two measuring pick-ups, which are offset one relative to the other in axial direction, for sampling the part, the pick-ups being coupled to a computing device for calculating the manipulated variables necessary for the adjustment of concentricity of the part without any couple unbalance or parallel unbalance.

This permits concentricity of the part being chucked to be perfectly adjusted for concentricity, both with respect to parallel unbalances and with respect to couple unbalances.

Preferably, the computing device is coupled with a display for visual and/or acoustic indication of the manipulated variables.

It is thus possible to manually adjust the chucked part based on the indicated manipulated variables.

In addition to, or as an alternative configuration of the invention, the computing device may be coupled with automatic actuator means for automatically adjusting the adjusting units for concentricity of the chucked part.

This permits the adjustment of the part for correct concentricity to be carried out fully automatically.

This can be achieved by automatic actuator means, for example a stepping motor provided for each adjusting unit.

It is understood that the features of the invention mentioned above and those yet to be explained below can be used not only in the respective combinations indicated, but also in other combinations or in isolation, without leaving the scope of the present invention.

BRIEF DESCRIPTION OF THE DRAWINGS

Further features and advantages of the invention will become apparent from certain preferred embodiments of the invention which will be described hereafter with reference to the drawings which are of merely explanatory nature not intended to limit the scope of the invention and in which.

DETAILED DESCRIPTION OF PREFERRED EMBODIMENTS

Figure 1:
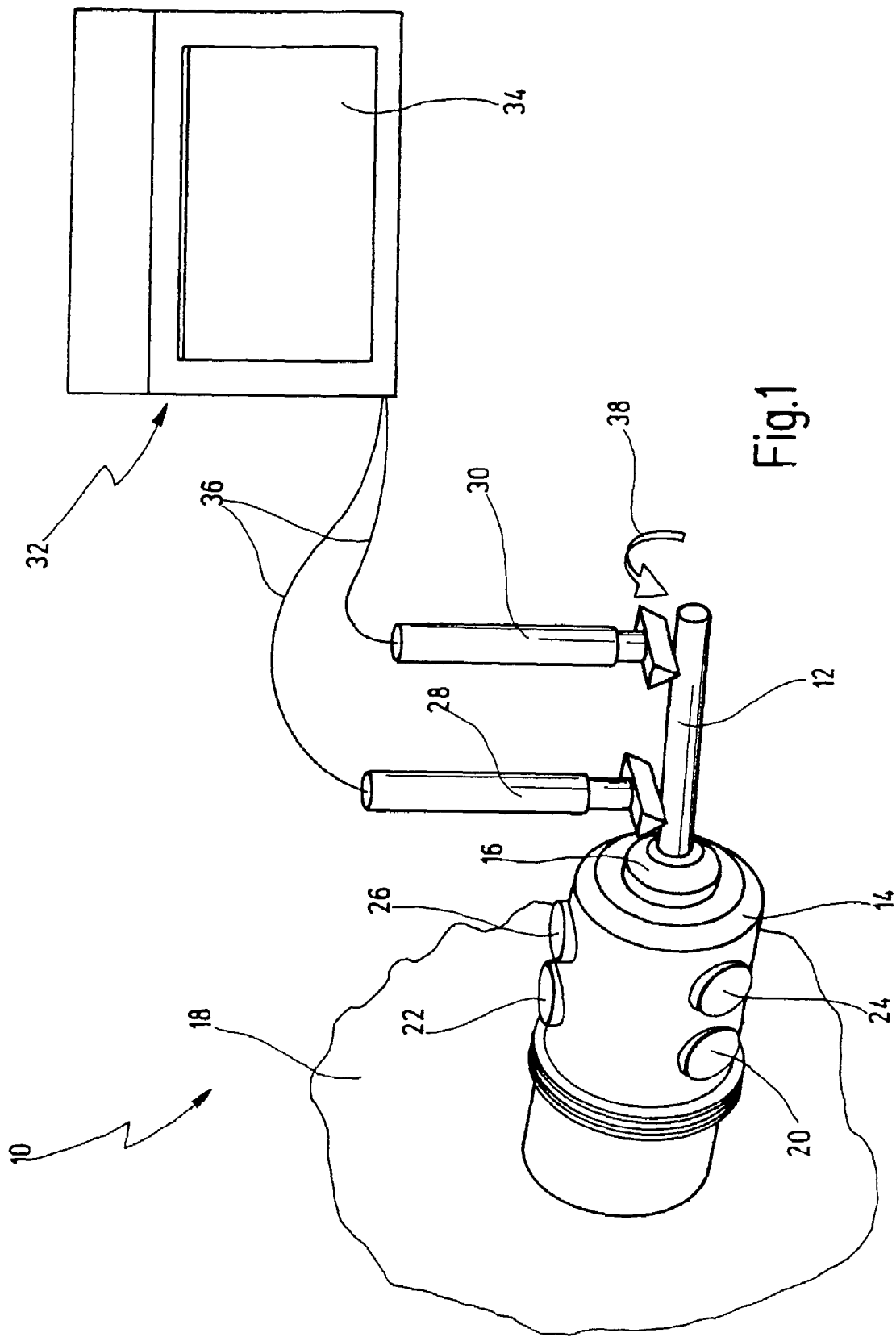
FIG. 1 shows a greatly simplified schematic rendering of a perspective view of a device according to the invention.

In FIG. 1, a device according to the invention for concentric chucking of a part 12 is indicated generally by reference numeral 10.

The device 10 comprises a chucking and adjusting fixture, indicated generally be reference numeral 14, in which a part 12 to be chucked can be mounted directly, clamped and centered. In the illustrated case, however, the part 12 is firmly clamped in a chucking device 16 which is then mounted in a chucking and adjusting fixture 14, where it is clamped and adjusted for concentricity.

The chucking device 16 may be any chucking means, for example a mechanical chuck, a shrink chuck or a split chuck, for example.

The chucking and adjusting fixture 14 in its turn is mounted on a rotary drive, which is illustrated in FIG. 1 only schematically and is indicated by reference numeral 18. The chucking and adjusting fixture comprises three clamping and three adjusting units, mounted in a radial plane of the chucking and adjusting fixture 14, with two such sets of adjusting units and clamping units being provided in offset arrangement one behind the other, in axial direction.

In the case illustrated in FIG. 1, two adjusting units 20, 22 and 24, 26, respectively, are mounted in a radial plane while the third unit is not visible in the drawing. The third unit associated to each radial plane is a clamping unit which only permits clamping, but no adjusting operation, as will be described hereafter in more detail.

As can be seen in FIG. 1, two measuring devices 28, 30 are provided for determining concentricity deviations of a part 12 that is set into revolving operation (compare arrow 38). In order to be able to detect deviations both with respect to couple unbalances and with respect to parallel unbalances, two measuring devices 28, 30 are provided in axially offset arrangement.

In the simplest of all cases, these measuring devices may be dial gauges whole pointer deflection is converted to electric signals that are supplied to a computer device 32 via lines 36.

It is understood that the measuring devices 28, 30 used may of course be of any kind provided that they offer the required accuracy. For example, laser-based measuring devices would also be suited.

The signals received from the measuring devices 28, 30 are converted by the computing device 32 to manipulated variables by which the adjusting units 20, 22 and 24, 26, respectively, must be adjusted in a defined way for correctly adjusting the chucked part 12 to approximate zero concentricity.

The respective signals may be supplied to a display 34, for indicating them to an operator visually and/or acoustically. The manipulated variables supplied by the computing unit 32 to the display 34 may, for example, be expressed in angular degrees by which setscrews provided on the four adjusting units 20, 22 and 24, 26, respectively, have to be turned in clockwise or in counterclockwise direction in order to obtain concentricity.

Figure 2:
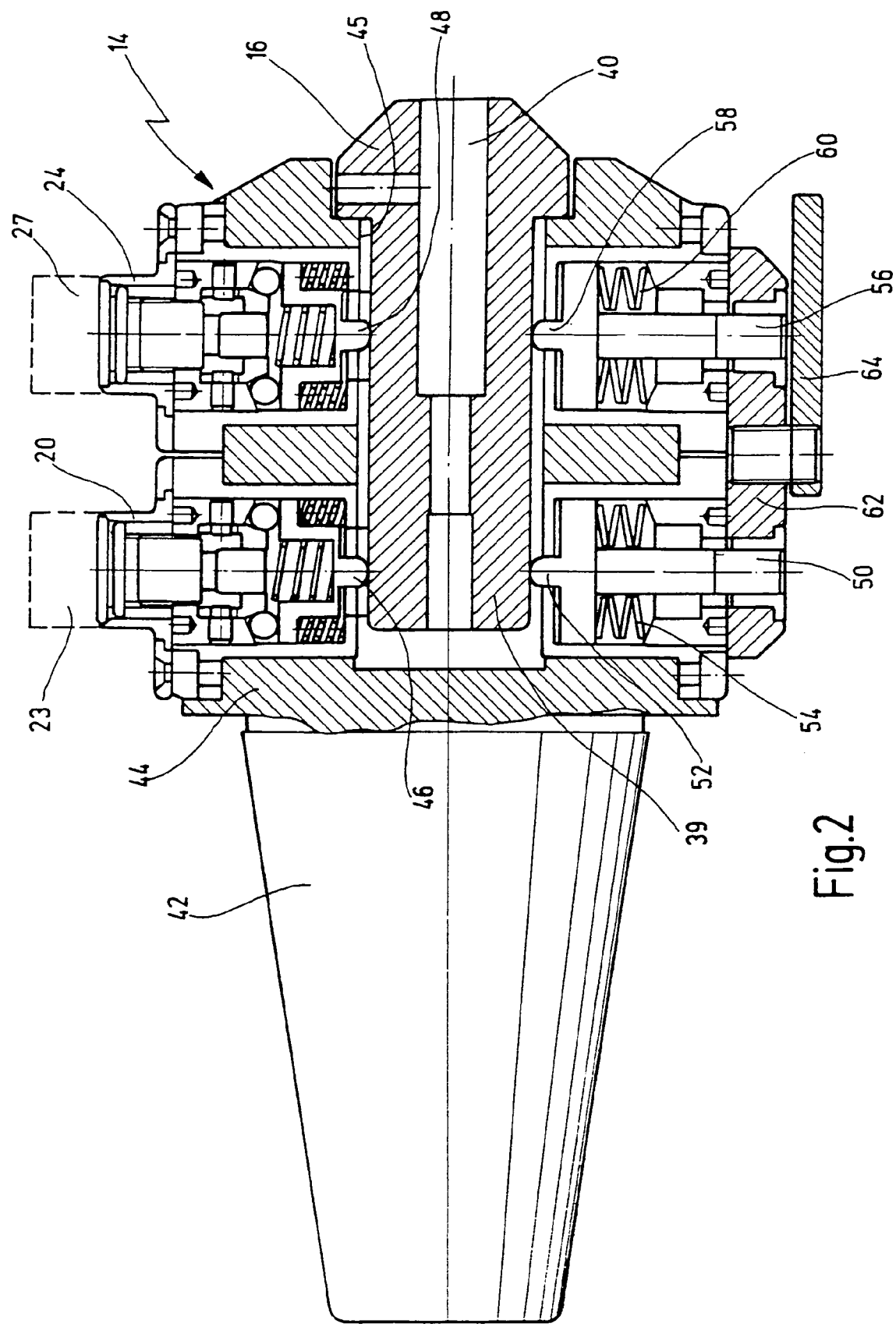
FIG. 2 shows a longitudinal, in part sectional, view of a chucking and adjusting fixture according to the invention with a chuck received in it for mounting a part.
Figure 3:
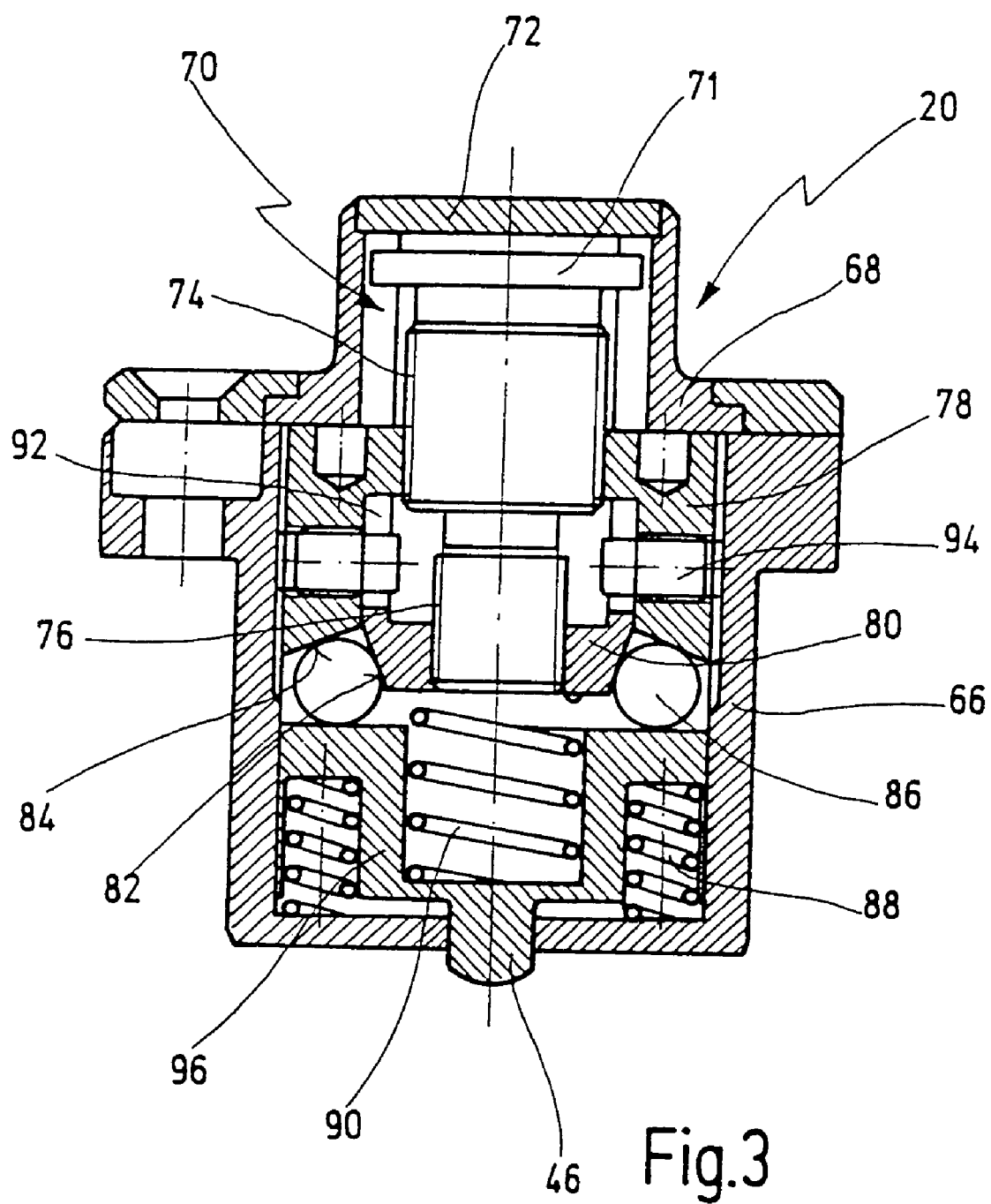
FIG. 3 shows an enlarged section through one of the adjusting units according to FIG. 2.

As to the detailed structure of the device according to the invention reference is made to FIGS. 2 and 3.

The chucking and adjusting fixture 14 comprises a housing 44 in which a bore 45 is provided for receiving a part to be chucked or, as shown in the drawing, for mounting a chucking device 16. At the end of the housing 44 opposite the bore 45, there is provided some sort of connection element for fixing the chucking and adjusting fixture 14. This connection element may consist, for example, of a standardized clamping cone 42 (as illustrated in the drawing).

In the area of the bore 45 of the housing 44, two sets of three clamping and/or chucking units are mounted at an axial distance.

In the drawing plane of FIG. 2, two units, being axially offset one to the other, can be seen while the respective third unit lies outside the drawing plane. In a first radial plane, for example, there can be seen an adjusting unit indicated by reference numeral 20, and an associated clamping unit 50. In a second radial plane, which is axially offset relative to the first plane, there can be seen a second adjusting unit 24 and an associated clamping unit 56.

The adjusting units 20, 24, and the two other adjusting units 22, 26 outside the drawing plane, exhibit the same structure. Likewise, the clamping units 50, 56 are configured identically. The adjusting units 20, 24 and 22, 26, respectively, comprise plungers 46, 48 that project radially into the bore 45. Correspondingly, the clamping units 50, 56 comprise plungers 52, 58 that likewise project radially into the bore 45.

One generally obtains in this way a six-point fixture in which a clamping section 39 of the clamping device 16 can be clamped. The two adjusting units 20, 22, and the associated clamping unit 50 of the first radial plane, as well as the two adjusting units 24, 26 and the associated clamping unit 56 of the second radial plane, are offset one from the other by an angle of 120°. In addition, the sides of the clamping section 39 to be clamped in this way may exhibit corresponding flat surfaces.

While the plungers 46, 48 of the adjusting units 20, 22, 24, 26 can be adjusted in radial direction in a defined way, the plungers 52, 58 of the two clamping units 50, 56 merely can be released or clamped jointly in radial direction by actuation of a clamping lever 64. To this end, both plungers 52, 58 of the clamping units 50, 56 are supported via cup springs 54, 60 on a common chuck housing 62. Rotation of a clamping lever acting upon the chuck housing 62, will either cause the two plungers 52, 58 to move into the clamping position illustrated in FIG. 2, in which the two plungers 52, 58 are urged radially against the clamping section 39 of the chucking device 16, by the force of the cup springs 54 and 60, respectively, or else the two plungers 52, 58 to move radially outwardly from the clamping position into a released position.

In FIG. 2, there are further indicated by broken lines 23 and 27, respectively, two optional stepping motors by means of which the adjusting units 20 and 24 and, correspondingly, the adjusting units 22 and 26, respectively, can be adjusted automatically if automatic concentricity adjustment should be desired.

The structure of the adjusting units will now be described in more detail with reference to FIG. 3.

The adjusting unit as shown in FIG. 3 comprises a first cup-shaped housing part 66, which contains an actuator means 70 for adjustment of the plunger 46, the actuator means 70 being enclosed on its outside by a second housing part 68.

Each of the adjusting units 20, 22, 24, 26 is fixed in its entirety, in a suitable way by screw connections, in corresponding radial bores in the housing 44 of the chucking and adjusting fixture.

The actuator means 70 of a respective adjusting unit 20 comprises an adjusting bolt 71 that can be turned from the outside via an adjusting disk 72. The adjusting disk 72 preferably is provided with marks that coact with suitable marks on the housing part 68, for permitting defined turning of the adjusting bolt 71. The adjusting disk 72 is provided with a slot or the like which permits adjustments to be effected using a tool.

The adjusting bolt 71 comprises a first threaded section 74 which can be adjusted in an associated internally threaded section of a flange-shaped receiving body 78 which in turn is fixed against rotation. At the end of the adjusting bolt 71, opposite the adjusting disk 72, there if further provided a second threaded section 76 that has a smaller pitch than the first threaded section 74. Guided on that second threaded section 76 is an adjusting cone 80 provided with a corresponding internal thread, which cone is fixed against rotation and guided on the receiving body 78 by means of lateral screws 94 engaging in an axial guide 92. Rotation of the adjusting bolt 71 therefore moves the adjusting cone 80 in radial direction of the chucking and adjusting fixture or in axial direction of the adjusting unit 20.

The adjusting cone 80 comprises an outer conical surface 82 that acts on a plurality of balls 86. The balls 86 are held between the outer conical surface 82, an inner conical surface 84 at the end of the receiving body 78 and a flange 96, whose end opposite the adjusting disk 72 carries the plunger 46, which is formed integrally with it. The plunger 46 projects into the bore 45 of the chucking and adjusting fixture 14 through a corresponding opening in the housing part 66. The pitches of the two threaded portions 74, 76 of the adjusting bolt 71 differ by 10%. As a result, a stepping-down ratio of 1:10 is obtained which means that when the adjusting bolt is moved by 100 µm in radial direction of the chucking and adjusting fixture 14, the adjusting cone will only move by an amount of 10 µm. As the balls 86 are held between the outer conical surface 82 of the adjusting cone 80 and the inner conical surface 84 of the receiving body 78, the balls 86 will additionally move laterally along the inner conical surface 84 of the receiving body 78 during displacement of the adjusting cone 80. This results in a further stepping-down effect by a corresponding amount, depending of the respective angle ratios.

In this way, a high stepping-down effect is achieved whereby sensitive adjustment of the position of the plunger is rendered possible.

The flange 96 is biased toward the balls 86 by a total of four compression springs 88 supported on the first housing part 66 and accommodated in suitable bores of the flange 96. A central recess in the flange 96 further accommodates a second compression spring 90 that acts on the end face of the adjusting cone 80 for biasing it outwardly toward the adjusting disk 72. That spring 90 only serves to support the resetting motion of the adjusting cone 80 in case of an outward movement of the adjusting bolt 71.

The function of the device 10 according to the invention will now be described once more in concise terms.

To begin with, a part 12 to be aligned is clamped in a bore 40 of the chucking device 16, for example mechanically or by means of a shrink fit in a shrink chuck.

The adjusting units 20, 22, 24, 26 are then preferably reset to zero, whereafter the clamping units 50, 56 are moved to their released positions by actuation of the clamping lever 64. In that position, the clamping section 39 of the chucking device 16 can be inserted into the bore 45 of the chucking and adjusting fixture 14. The clamping units 50, 56 are then transferred to their clamping positions, using the clamping lever 64, so that the clamping section 39 of the chucking device 16 is firmly clamped in the chucking and adjusting fixture 14. Now, the rotary drive 18 is switched on, and any deviations from concentricity are determined by the two measuring devices 28, 30. Based on the concentricity deviations measured, the computing means 32 now determines the manipulated variables for all of the four adjusting units 20, 22 and 24, 26, respectively, giving due consideration to the known data of the adjusting devices. Consequently, it is determined for each adjusting unit by corresponding computation whether, and by what angular amount, the respective unit must be turned in clockwise or counterclockwise direction. It is then possible, by corresponding adjustment of the adjusting disks of the adjusting units 20 to 26, to adjust the system so that correct concentricity of the part 12 is achieved, free from any couple unbalances or parallel unbalances.

It is thus possible to achieve concentricity accuracies of below 5 µm, approximately in the range of 3 µm or less.

If desired, adjustment can be effected even automatically, for example by the use of automatic adjusting means, for example in the form of stepping motors, as indicated in FIG. 2.

What is claimed is:

1. A device for the concentric chucking of rotatingly drivable parts, comprising:
    a housing comprising a bore for receiving a part;
    a rotary drive for driving said housing about a rotary axis;
    a first set of at least three clamping units arranged radially within said housing for clamping said part;
    a second set of at least three clamping units arranged radially within said housing for clamping said part, said first set being axially offset from said second set;
    actuators provided on at least two of said clamping units of said first set and on at least two of said clamping units of said second set, said actuators being configured for radially adjusting said part;
    a measuring device comprising two measuring pick-ups, arranged axially offset relative to one another for sampling said part when said housing is driven about said rotary axis to generate output data indicative for deviations of said part from concentricity with respect to said rotary axis;
    a computing device coupled with said measuring pick-ups for receiving said output data and for computing control data there from, said control data being input to said actuators for automatically controlling said actuators to radially adjust said part to effect concentricity of said part with respect to said rotary axis avoiding couple unbalances and parallel unbalances.

2. The device of claim 1, wherein said clamping units are arranged within said housing around said bore at equal angular spacings one from the other.

3. The device of claim 1, wherein said actuators comprise radially adjustable plungers.

4. The device of claim 3, wherein one of said clamping units comprises a radially drivable plunger.

5. The device of claim 3, wherein each of said actuators comprises a stepping motor for driving said actuator.

6. The device of claim 1, wherein said actuators comprise at least one element for radially adjusting said plunger, said element being selected from the group formed by a setscrew and a servo-drive.

7. The device of claim 1, comprising a chuck for chucking said part within a central chucking bore thereof, said chuck having an outer surface received within said bore of said housing.

8. The device of claim 1, wherein each of said actuators comprises a stepping motor for driving said actuator.

9. The device of claim 8, wherein said clamping units are arranged within said housing around said bore at equal angular spacings one from the other.

10. The device of claim 9, wherein said clamping unit comprises a spring urging said plunger inwardly in radial direction.

11. The device of claim 8, wherein said actuators comprise radially adjustable plungers.

12. The device of claim 8, wherein each of said actuators means comprises a differential thread having two threads of different pitches, a difference of travel between said two threads being converted to an actuator travel value for radial adjustment.

13. The device of claim 1, wherein said computing device is configured for generating control data for radially adjusting said part avoiding couple unbalances and parallel unbalances.

14. A device for the concentric chucking of rotatingly drivable parts, comprising:
    a housing comprising a bore for receiving a part;
    a rotary drive for driving said housing about a rotary axis;
    a first set of at least three clamping units arranged radially within said housing for clamping said part;
    a second set of at least three clamping units arranged radially within said housing for clamping said part, said first set being axially offset from said second set;
    actuators provided on at least two of said clamping units of said first set and on at least two of said clamping units of said second set, said actuators being configured for radially adjusting said part;
    a measuring device comprising two measuring pick-ups, arranged axially offset relative to one another for sampling said part when said housing is driven about said rotary axis to generate output data indicative for deviations of said part from concentricity with respect to said rotary axis;
    a computing device coupled with said measuring pick-ups for receiving said output data and for computing control data there from, said control data being input to said actuators for controlling said actuators to radially adjust said part to effect concentricity of said part with respect to said rotary axis.

15. The device of claim 14, wherein said computing device is configured for generating control data for radially adjusting said part avoiding couple unbalance and parallel unbalance.

16. The device of claim 15, wherein one of said clamping units comprises a radially drivable plunger.

17. The device of claim 15, wherein said actuators comprise at least one element for radially adjusting said plunger, said element being selected from the group formed by a setscrew and a servo-drive.

18. The device of claim 14, comprising a chuck for chucking said part within a central chucking bore thereof, said chuck having an outer surface received within said bore of said housing.

19. The device of claim 14, wherein said actuators are controlled by said computing device for automatically adjusting said actuators to effect concentricity of said part.

20. A device for the concentric chucking of rotatingly drivable parts, comprising:

a housing comprising a bore for receiving a part;

a rotary drive for driving said housing about a rotary axis;

at least three clamping units arranged radially within said housing for clamping said part;

actuators provided on at least two of said clamping units, said actuators being arranged for radially adjusting said part;

a measuring device comprising two measuring pick-ups, arranged axially offset relative to one another for sampling said part when said housing is driven about said rotary axis to generate output data indicative for deviations of said part from concentricity with respect to said rotary axis;

a computing device coupled with said measuring pick-ups for receiving said output data and for computing control data there from, said control data being input to said actuators for controlling said actuators to radially adjust said part to effect concentricity of said part with respect to said rotary axis.

* * * * *